April 23, 1963   F. W. LEHAN ETAL   3,087,111
GEOPHYSICAL EXPLORATION APPARATUS
Filed July 31, 1959

FRANK W. LEHAN
WILLIAM R. HUGHES
INVENTORS

BY *Allen E. Bohney*

ATTORNEY

United States Patent Office 3,087,111
Patented Apr. 23, 1963

3,087,111
GEOPHYSICAL EXPLORATION APPARATUS
Frank W. Lehan, Glendale, and William R. Hughes, Sylmar, Calif., assignors, by mesne assignments, to Space-General Corporation, Glendale, Calif., a corporation of California
Filed July 31, 1959, Ser. No. 830,844
9 Claims. (Cl. 324—1)

The present invention relates in general to the art of geophysical exploration and more particularly to an apparatus and method utilizing atmospheric electricity for conducting geological surveys.

Exploration geophysics may be defined as the art of applying the physical sciences to the study of the structure and composition of those layers of the earth which are sufficiently shallow to be exploited by man. From a less sophisticated and more practical point of view, it is the art by which oil, gas and various kinds of mineral and ore deposits are sought and located, what is commonly referred to as "prospecting."

In relatively recent years, electrical prospecting techniques, which usually depend for their operation upon the effects produced at the surface of the earth by the flow of electrical current through subsurface formations, have become increasingly important. A number of electrical methods and equipment therefor are shown and described on pages 437 to 631 of the book entitled "Exploration Geophysics" written by J. J. Jakosky and published in 1950 by the Trija Publishing Company of Los Angeles, California.

An examination of these prior art methods will indicate that in order to apply them it is necessary to employ energizing electrodes which are inserted in the earth for the purpose of providing the desired subsurface current flow. It will at once be obvious, therefore, that since the earth currents are artificial, that is, man-made, transmitter equipment of one kind or another is required to be coupled to the electrodes. The need for transmitter equipment therefore forces these earlier techniques to be of a relatively expensive nature.

Furthermore, among those methods and systems that employ alternating currents and in particular among those that employ alternating currents over a range of frequencies, the amplitudes of the signals generated by the transmitter apparatus for establishing the earth currents must be regulated very closely or else the prospecting results may be in error. Those who are versed in this art will recognize that unless these amplitudes are regulated, it is difficult if not impossible to determine whether variations in the test readings over a range of frequencies are due to subsurface characteristics or to fluctuations in the amplitudes of the current producing signals. Such a requirement obviously limits the usefulness of such methods and apparatus.

It is, therefore, an object of the present invention to provide an electrical method and electrical apparatus that do not require the use of transmitter equipment for conducting geophysical surveys.

It is another object of the present invention to provide an electrical method for conducting geological explorations that does not require artificial earth currents.

It is an additional object of the present invention to provide an alternating-current method and apparatus for subsurface explorations that are substantially independent of signal amplitudes.

The method and apparatus of the present invention obviate the above and other limitations, restrictions and disadvantages encountered among prior art methods and devices of the type mentioned and, in accordance with the basic concept of the invention, this is done both by making use of various electrical disturbances in the atmosphere as an earth current source, such as distant lightning, for example, and also by obtaining two different electric field readings at each frequency over a range of frequencies, the ratio of the readings at each frequency being the ultimate exploration data.

More specifically, atmospheric electricity, which is ever present at all frequencies within the very low frequency, sub-audio and audio frequency ranges, causes currents to flow in the subsurface and these currents, in turn, produce electric and magnetic fields at the surface. The present invention encompasses the idea of measuring the vertical and horizontal components of this electric field at each frequency under consideration and of then taking the ratio of each pair of components. This is done at different points or locales in a surface area being investigated and, by so doing, the inclination of the electric field vector at each frequency is thereby obtained for each locale in the area. In other words, the slope versus frequency curve for the electric field vector is obtained at each locale and if there is any sharp discontinuity in the curve then this will indicate a corresponding subsurface discontinuity which may be in the form of a mineral or ore deposit. The frequency at which the discontinuity in the curve occurs also provides an indication of the depth at which the subsurface discontinuity occurs.

It is quite plain that the utilization of atmospheric electrical disturbances to produce telluric currents eliminates the need for transmitter apparatus. This simplification substantially reduces the cost of surveying equipment and also the cost of conducting surveys. Furthermore, through the use of the subject invention, there is no longer any need for stringent amplitude regulation as heretofore since it is the inclination or slope of the electric field vector that is measured and this will remain substantially constant at any one frequency irrespective of any variations that may occur in the amplitude of the signal producing the electric field. The possibility of erroneous results is therefore minimized.

The novel features which are believed to be characteristic of the invention, both as to its organization and method of operation, together with further objects and advantages thereof, will be better understood from the following description considered in connection with the accompanying drawing in which two embodiments of the invention are illustrated by way of example. It is to be expressly understood, however, that the drawing is for the purpose of illustration and description only and is not intended as a definition of the limits of the invention.

Figure 1:
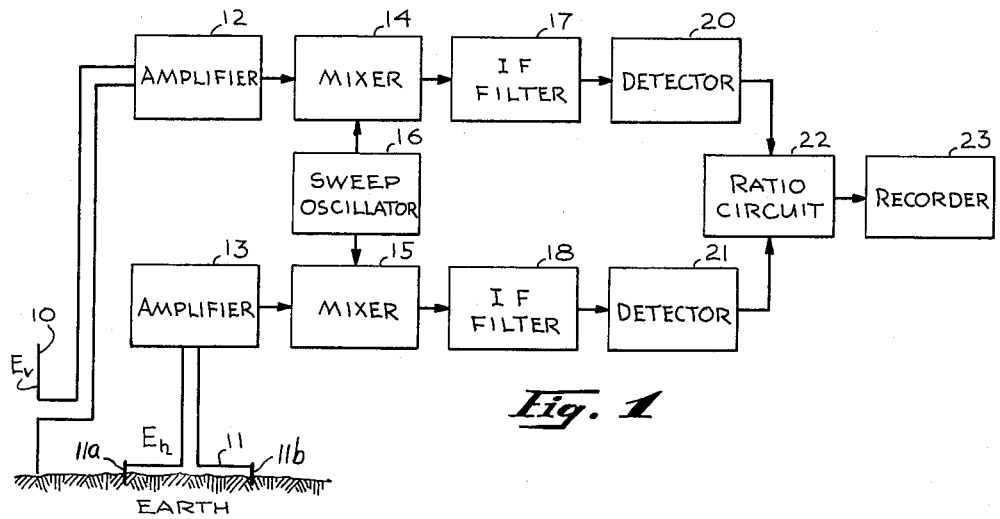
FIGURE 1 shows a block diagram of one embodiment of the present invention.

Referring now to the drawing and in particular to FIGURE 1 therein, the embodiment shown includes a pair of antennas 10 and 11, antenna 10 being designed to receive the vertical components of the surrounding electric fields and antenna 11 being designed to receive the horizontal components of these fields. Accordingly, antennas 10 and 11 may be suitably oriented dipole antennas, although other types of antennas, suitably oriented, may be used as well, as will be seen later. With respect to antenna 10, this antenna is vertical for picking up the vertical components of the electric fields. As for antenna 11, this antenna is horizontal for picking up the horizontal components of the electric fields and, for this purpose, the ends of antenna 11 are preferably grounded by means of electrodes 11a and 11b.

Antennas 10 and 11 are respectively connected through a pair of amplifiers 12 and 13 to the first input terminals of a pair of mixer circuits 14 and 15, a sweep oscillator 16 being connected to the second input terminals thereof. As the name implies, sweep oscillator 16 produces a signal whose frequency recurrently varies in some prescribed manner, preferably in sawtooth fashion.

Mixers 14 and 15 are respectively connected to intermediate-frequency filters 17 and 18 which, in turn, are respectively connected to detector networks 20 and 21. As is well known, filters 17 and 18 are very narrow band in character and permit only signals of the predetermined intermediate frequency to pass through.

The embodiment of FIG. 1 also includes a ratio circuit 22 connected between detectors 20 and 21, the output of the ratio circuit being connected to a recorder mechanism 23 which may be of the stylus type. Ratio circuit 22 is a device that produces an output signal that is proportional to the ratio of its input signals, that is to say, circuit 22 is the type of device that divides one of its inputs by the other of its inputs and produces an output that is proportional to the quotient thereof. For this purpose, ratio circuit 22 is preferably the combination of an inverter and linear modulator, the inverter receiving one of the detector outputs and producing from it an output that is the reciprocal of its input and the linear modulator multiplying the outputs from the inverter and the other detector, thereby producing the desired ratio of the detector outputs.

In considering the operation, mention should first be made of the fact that a horizontal component of the electric field produced immediately above the ground by subsurface currents may be represented by the following equation, namely, $$E_h = \frac{\sqrt{2} E_v}{\eta \delta} \quad (1)$$

where, $E_h$ is the horizontal component of the electric field;
$E_v$ is the vertical component of the electric field;
$\eta$ is the intrinsic impedance of space and is equal to 377 ohms; and
$\delta$ is the symbol for skin depth effect.

Since $$\delta = \sqrt{\frac{2}{\mu \sigma \omega}} \quad (2)$$

then, by substituting the value of $\delta$ in Equation 2 for $\delta$ in Equation 1, Equation 1 becomes:

$$E_h = \frac{\sqrt{\mu \sigma \omega} E_v}{\eta} \quad (3)$$

where, $\mu$ is the permeability of space;
$\sigma$ is the conductivity of the earth; and
$\omega$ is $2\pi f$, where $f$ is frequency.

By dividing both sides of Equation 2, the ratio of $E_h$ to $E_v$ is obtained, that is, $$\frac{E_h}{E_v} = \frac{\sqrt{\mu \sigma \omega}}{\eta} \quad (4)$$

It will be recognized by those skilled in the art that "$\mu$" and "$\eta$" are constants in Equation 4. Accordingly, if the conductivity term "$\sigma$" is also constant, then the ratio of $E_h$ to $E_v$ is a function solely of the square root of "$\omega$," that is to say, if "$\sigma$" is constant, then $$\frac{E_h}{E_v} = k \omega^{1/2}$$

and it will be obvious that a graphical plot of $$\frac{E_h}{E_v}$$

versus $\omega^{1/2}$ is a straight line whose slope is $$\frac{\sqrt{\mu \sigma}}{\eta}$$

In fact, if the character of the earth below the surface at any one locale does not change too radically, then "$\sigma$" will remain substantially constant at that locale and the referred-to graphical plot will be substantially a straight line. On the other hand, if the subsurface conductivity should experience a sharp change in value at some depth, as may be occasioned by mineral or ore deposits, then a discontinuity will appear in the curve and the frequency at which the discontinuity occurs provides an indication of the depth at which the subsurface change in conductivity occurs or, stated differently, the approximate depth of the mineral or ore deposit. Looking at it from a somewhat different point of view, if the subsurface conductivity changes at some depth, then the slope of the straight line, that is $$\frac{\sqrt{\mu \sigma}}{\eta}$$

also changes, thereby causing the discontinuity spoken of above. It is thus seen that by obtaining the values of $E_h$ and $E_v$ at each frequency used and by plotting the ratio of these values as a function of frequency, a straight-line curve is obtained that provides an insight as to whether subsurface mineral or ore deposits exist. As mentioned before, the indication is provided by whether or not the curve experiences a sharp change in slope.

Figure 2:
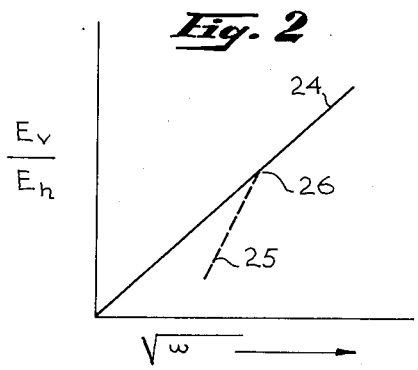
FIGURE 2 is a graph of the slope of the electric field vector versus frequency.

Reference is now made to FIG. 2 wherein is shown a solid straight-line curve 24 that fairly represents the sort of curve that might be expected when the ratio of $E_h$ to $E_v$ is plotted against $\omega^{1/2}$ in a locale where the conductivity of the earth is substantially constant at the various depths to which the earth currents penetrate, which is to say that there are no subsurface ore or mineral deposits located there. FIG. 2 also includes a broken-line curve 25 which illustrates the type of deviation from curve 24 that may be expected when deposits exist in an area, the deviation commencing at point 26. The explanation is that when ore or mineral deposits exist at some level below the surface of the earth, the conductivity of the earth at that level is altered, wtih the result that the slopes of the electric field vectors detected on the surface of the earth at the frequencies of the currents penetrating to that level are correspondingly altered. In other words, the value of $E_h/E_v$ changes at these frequencies; hence curve 25.

More specifically, due to the phenomena known as skin effect, atmospheric signals at different frequencies produce telluric currents that penetrate the earth to different depths. Hence, when the conductivity of the earth at some level changes from that above it, the subsurface currents at that level or depth are affected thereby and so are the associated electric fields at the surface. The effect generally is to change the magnitudes of the horizontal and vertical components of those fields which, it will be obvious, thereby alter the inclinations of the associated field vectors. This causes deviation 26 and curve 25. The depths to which currents at different frequencies typically penetrate the earth are as follows:

| Frequency in c.p.s.: | Depth in feet |
|---|---|
| 0 | ∞ |
| 1 | 3300 |
| 4 | 1650 |
| 100 | 825 |
| 1000 | 83 |

Thus, by way of example, if the conductivity of the earth at a depth of approximately 825 feet is different from the conductivity of the earth above this depth due to deposits there, then the ratio of $E_h$ (the horizontal components of the electric field) to $E_v$ (the vertical component of the electric field) as measured at the surface of the earth at a value of "$\omega$" corresponding to about a frequency of 100 cycles per second will also be different from the previous ratios. This difference manifests itself as a deviation from the curve being obtained, such as deviation 26 in FIG. 2. The frequency at which the deviation occurs provides an indication of the depth of the ore or mineral deposit.

Returning now to a consideration of the operation of FIG. 1, the vertical and horizontal components of the electrical field at all frequencies are picked up, respectively, by antennas 10 and 11 wherein alternating current signals at the various frequencies are induced. These signals are respectively amplified by amplifiers 12 and 13 and then passed on to mixers 14 and 15 wherein they are heterodyned against the output of sweep oscillator 16. The range of frequencies swept through by the oscillator signal is such that when it is heterodyned against the signals out of amplifiers 12 and 13, a continuous signal substantially at a fixed intermediate frequency is produced by each of filters 17 and 18. The signals out of the filters are continuous and always at the same intermediate frequency because the signals passed to mixers 14 and 15 by the amplifiers simultaneously cover a wide range of frequencies and, as oscillator 16 sweeps through its own range of frequencies, there is always one combination of frequencies in the heterodyning process that produces the referred-to intermediate frequency.

Furthermore, the amplitude of the signal out of filter 17 at any moment is proportional to the amplitude of that signal out of amplifier 12 whose frequency, when combined with the frequency of the signal out of oscillator 16, produces the said intermediate frequency. It will be apparent that the amplitude of the signal out of filter 17 at any moment is also proportional, therefor, to the magnitude of the vertical component of the frequency associated electric field. By similar reasoning, it will be seen that the amplitude of the signal out of filter 18 at any moment is proportional to the magnitude of the horizontal component of the frequency associated electric field.

The intermediate-frequency signals passed by filters 17 and 18 are respectively applied to detectors 20 and 21 which, in essence, rectify and average these signals to respectively produce voltages whose amplitudes vary as the amplitudes of the associated intermediate-frequency signals. It will be recognized that these varying voltages are respectively a measure also of the magnitude of the vertical and horizontal components of the electric fields produced by the multi-frequency earth currents. The voltages produced by detectors 20 and 21 are applied to ratio circuit 22 which, as previously mentioned, divides one voltage by the other. Specifically, the voltage from detector 21 is divided by the voltage out of detector 20 so that the voltage produced by circuit 22 accurately reflects the ratio of the horizontal component to the vertical component of the electric field at each frequency at which the electric field exists. In general, it can be said that the voltage produced by ratio circuit 22 is proportional to $E_h/E_v$. This voltage is applied to stylus type recorder 23 which produces a visible record of the ratio of the field components at each frequency thereof. In the event no ore or mineral deposits exist at the locale being surveyed, then the record produced by recorder 23 is that of straight-line curve 24 in FIG. 2. On the other hand, if there are deposits, the record will resemble curve 25 instead, the location of deviation 26 providing an indication of the depth of the deposits below the surface of the earth for the reasons previously advanced.

Figure 3:
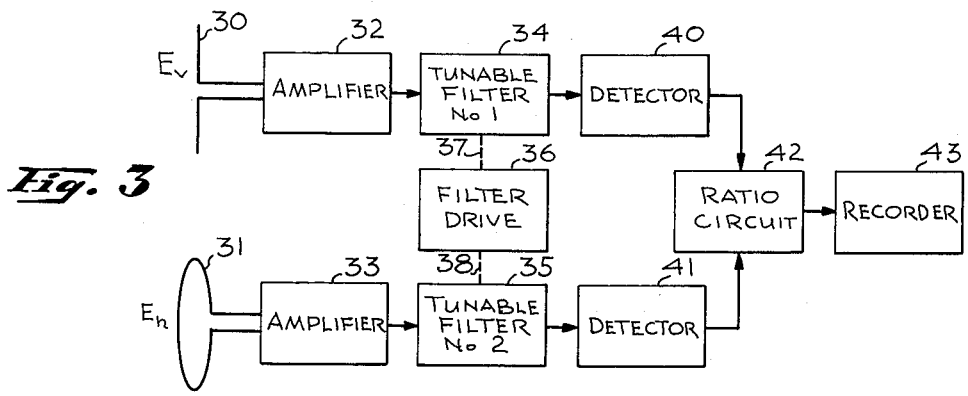
FIGURE 3 is a block diagram of another embodiment of the present invention.

Another embodiment of the present invention is shown in FIG. 3 and, as shown, this embodiment also comprises a pair of antennas 30 and 31 for respectively picking up or detecting the vertical and horizontal components of the existing electric fields. It should be noted here, however, that antenna 31 is a vertically oriented loop antenna instead of a dipole grounded at its ends as used in the embodiment of FIG. 1. Antennas 30 and 31 are respectively connected to a pair of amplifiers 32 and 33 which, in turn, are connected to a pair of tunable filters 34 and 35. The narrow passband of filters 34 and 35 may be varied and this is done by means of a drive mechanism 36 mechanically coupled to both filters as indicated by dashed lines 37 and 38.

The output ends of filters 34 and 35 are respectively connected to a pair of detectors 40 and 41, a ratio circuit 42 of the type previously described being connected between the output terminals of the detectors. A recorder mechanism 43, preferably of the stylus type, is connected to the ratio circuit at the output end thereof.

In operation, antennas 30 and 31 respectively pick up the vertical and horizontal components of the electric field at all frequencies at which the electric field exists. As a result, alternating-current signals corresponding to the field components at the various frequencies are induced in the antennas and these signals are passed on to amplifiers 32 and 33 for amplification. After amplification, the signals associated with the vertical field components are applied to tunable filter 34 and those associated with the horizontal field components are applied to tunable filter 35. Since the very narrow passbands of the filters are being swept through a range of frequencies and in unison, then, of the signals at all the different frequencies being simultaneously applied to the filters, only one signal at one frequency is passed through at a time. In other words, the output of each filter is at successively different frequencies, the frequencies of the filter outputs being, of course, the same as the frequencies of the electric field components. Moreover, the amplitude of the signal out of either filter at any moment corresponds to the strength or magnitude of the associated electric field component.

The signals passed by filters 34 and 35 are respectively applied to detectors 40 and 41 which, as before, rectify and average the filter outputs to produce voltages whose varying amplitudes are proportional to the respective signal amplitudes. These two voltages are applied to ratio circuit 42 which divides one voltage by the other, the resulting voltage produced by the ratio circuit being applied to recorder 43 for recordation. Thus, as explained in connection with the embodiment of FIG. 1, the curve recorded by recorder 43 is a plot of $E_h/E_v$ (the horizontal component of the electric field divided by the vertical component of the electric field) versus "$\omega$" for the locale at which the survey is being conducted. At another locale in the area, another such curve will be obtained. If any deviation from the curve should occur, the value of "$\omega$" or, stated differently, the frequency at which the deviation occurs provides an indication of the depth at which the ore or mineral deposits may be found.

It should be noted that instead of dividing $E_h$ by $E_v$, equally valid results may be obtained by dividing $E_v$ by $E_h$.

Having thus described the invention, what is claimed as new is:

1. Geophysical exploration apparatus that utilizes electric fields established at the earth's surface by atmospheric electricity, the electric fields respectively being established at different frequencies over a range of frequencies, said apparatus comprising: first and second means coupled to the electric fields and adapted to respectively respond to first and second components thereof to produce first and second voltages whose amplitudes vary as the magnitudes of the components over the range of frequencies, said first and second means respectively including first and second antenna means adapted to respectively receive horizontal and vertical components of the electric fields over the range of frequencies and to respectively develop first and second pluralities of signals in response thereto, a sweep oscillator circuit for generating a sweep signal whose frequency recurrently varies in a prescribed manner between lower and upper limits, first and second mixer circuits respectively coupled between said first and second antenna means and said sweep oscillator to heterodyne said first and second pluralities of signals against said sweep signal to produce first and second intermediate-frequency signals whose amplitudes vary as the amplitudes of said first and second pluralities of signals, and first and second detector means respectively coupled to said mixer circuits for producing said first and second voltages; third means coupled to said first and second means and operable in response to the first and second voltages therefrom to produce a third voltage whose amplitude at any instant is proportional to said first voltage at that instant divided by said second voltage at that instant; and a recorder mechanism coupled to said third means for presenting said third voltage as a function of frequency over the range of frequencies.

2. The apparatus defined in claim 1 wherein said first and second antenna means are first and second dipoles, respectively, said first dipole being horizontally oriented and grounded at its ends and said second dipole being vertically oriented.

3. The apparatus defined in claim 1 wherein said first and second antenna means are vertically oriented loop and dipole antennas, respectively.

4. Geophysical exploration apparatus that utilizes electric fields established at the earth's surface by atmospheric electricity, the electric fields respectively being established at different frequencies over a range of frequencies, said apparatus comprising: first and second means coupled to the electric fields and adapted to respectively respond to first and second components thereof to produce first and second voltages whose amplitudes vary as the magnitudes of the components over the range of frequencies, said first and second means respectively including first and second antenna means adapted to respectively receive horizontal and vertical components of the electric fields over the range of frequencies and to respectively develop first and second pluralities of signals in response thereto, a drive mechanism, first and second narrow band tunable filters coupled between said first and second antenna means, respectively, and said drive mechanism, said first and second filters being recurrently and continuously tuned by said drive mechanism over the range of frequencies of said first and second pluralities of signals to pass said signals in succession, and first and second detector means respectively coupled to said first and second tunable filters for producing said first and second voltages; third means coupled to said first and second means and operable in response to the first and second voltages therefrom to produce a third voltage whose amplitude at any instant is proportional to said first voltage at that instant divided by said second voltage at that instant; and a recorder mechanism coupled to said third means for presenting third voltage as a function of frequency over the range of frequencies.

5. The apparatus defined in claim 4 wherein said first and second antenna means are first and second dipoles, respectively, said first dipole being horizontally oriented and grounded at its ends and said second dipole being vertically oriented.

6. The apparatus defined in claim 4 wherein said first and second antenna means are vertically oriented loop and dipole antennas, respectively.

7. Geophysical exploration apparatus that utilizes electric fields established at the earth's surface by atmospheric electricity, the electric fields thus established having a range of frequencies, said apparatus comprising: first antenna means adapted to receive first components of the electric fields over the range of frequencies and to respectively develop a first plurality of signals in response thereto; second antenna means adapted to receive second components of the electric fields over the range of frequencies and to respectively develop a second plurality of signals in response thereto; intermediate means coupled to said first and second antenna means for respectively producing first and second voltages in response to said first and second pluralities of signals, the amplitudes of said first and second voltages respectively varying as the amplitudes of said first and second pluralities of signals, said intermediate means including a sweep oscillator circuit for generating a sweep signal whose frequency recurrently varies in a prescribed manner between lower and upper limits, first and second mixer circuits coupled between said first and second antenna means, respectively, and said oscillator circuit, said first and second mixer circuits respectively heterodyning said first and second pluralities of signals against said sweep signal to produce first and second intermediate-frequency signals whose amplitudes vary as the amplitudes of said first and second pluralities of signals, and detector means coupled to said first and second mixer circuits for producing said first and second voltages; and output means coupled to said intermediate means for producing an output voltage whose amplitude is proportional to said first voltage divided by said second voltage.

8. Geophysical exploration apparatus that utilizes electric fields established at the earth's surface by atmospheric electricity, the electric fields thus established having a range of frequencies, said apparatus comprising: first antenna means adapted to receive first components of the electric fields over the range of frequencies and to respectively develop a first plurality of signals in response thereto; second antenna means adapted to receive second components of the electric fields over the range of frequencies and to respectively develop a second plurality of signals in response thereto; intermediate means coupled to said first and second antenna means for respectively producing first and second voltages in response to said first and second pluralities of signals, the amplitudes of said first and second voltages respectively varying as the amplitudes of said first and second pluralities of signals, said intermediate means including a drive mechanism, first and second narrow band tunable filters coupled between said first and second antenna means, respectively, and said drive mechanism, said first and second filters being recurrently and continuously tuned by said drive mechanism over the range of frequencies of said first and second pluralities of signals to pass said signals in succession, and detector means coupled to said first and second tunable filters for producing said first and second voltages; and output means coupled to said intermediate means for producing an output voltage whose amplitude is proportional to said first voltage divided by said second voltage.

9. Geophysical exploration apparatus that utilizes electric fields established at the earth's surface by atmospheric electricity, the electric fields thus established having a range of frequencies, said apparatus comprising: first antenna means adapted to receive first components of the electric fields over the range of frequencies and to respectively develop a first plurality of signals in response thereto; second antenna means adapted to receive second components of the electric fields over the range of frequencies and to respectively develop a second plurality of signals in response thereto; sweep circuitry coupled to said first and second antenna means for producing first and second intermediate signals whose amplitudes respectively correspond to selected ones of said first and second pluralities of signals; first and second detector means coupled to said sweep circuitry and operable in response to the first and second intermediate signals therefrom to respectively produce first and second voltages whose amplitudes vary as the amplitudes of said first and second intermediate signals; and output means coupled to said first and second detector means for producing an output voltage whose amplitude is proportional to said first voltage divided by said second voltage.

References Cited in the file of this patent
UNITED STATES PATENTS

| | | |
|---|---|---|
| 2,677,801 | Cagniard | May 4, 1954 |
| 2,731,596 | Wait et al. | Jan. 17, 1956 |
| 2,777,111 | Hunter | Jan. 8, 1957 |
| 2,903,642 | Seigel | Sept. 8, 1959 |
| 2,931,474 | McLaughlin et al. | Apr. 5, 1960 |